US010399423B2

(12) United States Patent
Trombetta et al.

(10) Patent No.: US 10,399,423 B2
(45) Date of Patent: Sep. 3, 2019

(54) LAMINATED GLAZING COMPRISING A CLIP FASTENING PROFILED STRIP WITH ADDITIONAL POLYMER TAPE AND PROFILED STRIP

(71) Applicant: SAINT-GOBAIN GLASS FRANCE, Courbevoie (FR)

(72) Inventors: Nicola Trombetta, Savigliano (IT); Giovanni Dalmasso, Cuneo (IT)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 15/576,041

(22) PCT Filed: May 20, 2016

(86) PCT No.: PCT/FR2016/051207
§ 371 (c)(1),
(2) Date: Nov. 21, 2017

(87) PCT Pub. No.: WO2016/189238
PCT Pub. Date: Dec. 1, 2016

(65) Prior Publication Data
US 2018/0154752 A1 Jun. 7, 2018

(30) Foreign Application Priority Data

May 22, 2015 (FR) ..................... 15 54612

(51) Int. Cl.
*B60J 10/70* (2016.01)
*B60J 1/00* (2006.01)
*B32B 17/10* (2006.01)

(52) U.S. Cl.
CPC ......... *B60J 10/70* (2016.02); *B32B 17/10036* (2013.01); *B32B 17/10293* (2013.01);
(Continued)

(58) Field of Classification Search
CPC .. B60J 1/004; B60J 1/006; B60J 10/70; B32B 17/10036; B32B 17/10293
(Continued)

(56) References Cited

U.S. PATENT DOCUMENTS

2006/0266460 A1    11/2006  Kreye
2010/0320797 A1*   12/2010  Schlater ................... B60J 10/70
                                                                    296/93

(Continued)

FOREIGN PATENT DOCUMENTS

DE    36 06 566 A1    9/1987
EP    0 945 296 A1    9/1999
(Continued)

OTHER PUBLICATIONS

International Search Report as issued in International Patent Application No. PCT/FR2016/051207, dated Sep. 14, 2016.

*Primary Examiner* — Joseph D. Pape
(74) *Attorney, Agent, or Firm* — Pillsbury Winthrop Shaw Pittman LLP (57) ABSTRACT

A glazing includes a laminated glazed element. The glazing includes a profiled strip including a groove for the clip fastening of a cover piece. The glazing further includes a polymer tape situated between the groove and an edge face of an interior substrate, or even also between a peripheral edge of an interior face and an interior flange.

20 Claims, 4 Drawing Sheets

(52) U.S. Cl.
CPC ............... *B60J 1/004* (2013.01); *B60J 1/006* (2013.01); *B32B 2605/006* (2013.01)

(58) Field of Classification Search
USPC .......................................................... 296/93
See application file for complete search history.

(56) References Cited

U.S. PATENT DOCUMENTS

| | | |
|---|---|---|
| 2012/0126567 A1 | 5/2012 | Timmermann |
| 2013/0033071 A1 | 2/2013 | Kurata et al. |

FOREIGN PATENT DOCUMENTS

| | | |
|---|---|---|
| WO | WO 01/45974 A1 | 6/2001 |
| WO | WO 01/85481 A1 | 11/2001 |
| WO | WO 2015/033202 A1 | 3/2015 |

* cited by examiner

LAMINATED GLAZING COMPRISING A CLIP FASTENING PROFILED STRIP WITH ADDITIONAL POLYMER TAPE AND PROFILED STRIP

CROSS-REFERENCE TO RELATED APPLICATIONS

This application is the U.S. National Stage of PCT/FR2016/051207, filed May 20, 2016, which in turn claims priority to French patent application number 1554612 filed May 22, 2015. The content of these applications are incorporated herein by reference in their entireties.

FIELD

The present invention relates to a glazing and in particular to a vehicle glazing, comprising a laminated glazed element comprising an exterior sheet of glass, an interior sheet of glass and a plastic interlayer situated between said two sheets of glass.

BACKGROUND

As with any laminated glazed element:
the exterior sheet of glass has an exterior face, an edge face and an interlayer face which faces toward the plastic interlayer sheet,
the interior sheet of glass has an interlayer face facing toward the plastic interlayer sheet, an edge face and an interior face.

It is known practice, for positioning and/or securing a cover piece on a glazed element, to use a profiled strip comprising a groove.

This profiled strip is generally fixed to the interior face of the glazed element using an interior flange which is bonded against this interior face.

For good adhesion of this interior flange to the glazed element that allows forced clip-fastening into the groove, this interior flange needs to be relatively wide (when the profiled strip is viewed in cross section, as is the case in the majority of the documents of the prior art).

The prior art recognizes two types of situation:
when the cover piece covers at least the groove protruding above the exterior face of the glazed element, as for example in patent applications EP 945 296, DE 3606566; and
when the cover piece covers at least the groove without protruding above the exterior face of the glazed element, as for example in patent applications WO 2001/045974 or WO 2001/85481 or even US 2006/0266460.

In the first situation, the cover piece needs to be sufficiently wide to cover at least the interior flange so that it cannot be seen from the outside and/or a masking band is produced further on the outside than the interior flange.

In the second situation, a masking band is produced further on the outside than the interior flange so as to cover at least the interior flange so that it cannot be seen from the outside.

In the second situation, the prior art also recognizes from patent application No. WO 2012/033202 and, from the invention of patent application No. US 2012/0126567, a particular profiled strip which has no lip situated against said edge face of said exterior substrate.

These two situations have in common the fact that the cover piece and/or the masking band are, themselves or together, at least as wide as the interior flange and, in general, wider than the interior flange; as a result, the field of view through the glazed element is reduced.

Furthermore, because of the presence of the interior flange at the corner between the edge face of the interior sheet of glass and the interior face thereof, the bead of adhesive that bonds the glazing to the adjacent body work needs to be positioned further toward the center of the glazing; now, this bead of adhesive has itself to be concealed from the outside.

Thus, it is common practice to consider that, along the edge of a glazing equipped with a groove profiled strip, it is a band from 30 to 35 mm wide that cannot be used for allowing light through and which thus decreases the field of view.

It is therefore important for the interior flange to have the smallest possible width; nevertheless, it still needs to be wide enough to allow good adhesion to the interior face, so as to allow forced clip-fastening.

For mechanical cohesion at the time of clip-fastening it may be important for the groove to be positioned very precisely in space.

This becomes all the more difficult when the edge face of this lower edge of the glazing in some points has a relatively small radius of curvature.

One additional difficulty stems from the fact that, despite all the precautions taken during the series-manufacture of the glazed elements, the dimensional spread from one glazed element of one and the same series to another (the fact that not all of the glazed elements have exactly the same dimensions) may be relatively great while the dimensional spread on the profiled strip is relatively small.

This is particularly the case when the glazed elements are laminated glazed elements; windshields, as a matter of necessity comprise laminated glazed elements.

SUMMARY

It is an object of the present invention to overcome these disadvantages by proposing a glazing comprising a profiled strip which allows forced clip-fastening and which is therefore firmly attached to the glazed element, while at the same time making it possible to keep the bottom of the groove very exactly at the desired point in space relative to the glazed element even though the latter may exhibit a degree of dimensional spread.

The glazing according to the present invention comprises, along at least part of at least one edge a profiled strip comprising a groove for the clip-fastening of a cover piece to said profiled strip, said cover piece comprising, viewed in cross section, a barbed hook that enters said groove during clip-fastening.

The present invention therefore intends to propose a solution to allow the groove to be pressed indirectly against a part of the edge face of the glazed element so as to fix the position of the groove.

Furthermore, the present invention intends to propose a solution for improving the sealing between the groove and the edge face of the glazed element and preventing the ingress of water.

The present invention thus relates to a glazing and in particular to a vehicle glazing, according to claim 1. This glazing comprises a laminated glazed element comprising:
an exterior substrate having an exterior face which faces an exterior space, an intermediate face opposite the exterior face, and a peripheral edge face,
an interior substrate having an interior face which faces an interior space, an intermediate face opposite the interior face, and a peripheral edge face, a plastic interlayer situated between and in contact (directly in contact or in contact with the interposition of another sheet of plastic) with the intermediate face of said exterior substrate and the intermediate face of said interior substrate, said glazing comprising along at least part of at least one edge a profiled strip comprising a groove for the clip-fastening of a cover piece to said profiled strip, said cover piece comprising, viewed in cross section, a barbed hook that enters said groove during clip-fastening, said profiled strip comprising a lip situated against said edge face of said exterior substrate, said profiled strip comprising, viewed in cross section, an interior flange situated underneath a peripheral edge of said interior face of said interior substrate.

This glazing is notable in that it further comprises a polymer tape situated between said groove and said edge face of said interior substrate, or even also between said peripheral edge of said interior face and said interior flange.

This polymer tape is chemically independent of the profiled strip; viewed in cross section, said strip is situated underneath said lip; it is distinct from the lip.

It is this is preferably an elastomer having a Young's modulus lower than that of the profiled strip and lower than that of the lip.

Said polymer tape is distinct from said groove. It is preferably situated along the profiled strip.

Said polymer tape may be made of a foam. This foam is preferably watertight sealing against the ingress of water.

Said polymer tape is preferably situated in contact with and against said groove and against said edge face of said interior substrate, or is furthermore situated in contact with and against said peripheral edge of said interior face and against said interior flange.

It is possible for the polymer tape to extend between said groove and the glazed element as far as being in contact with the edge face of the plastic interlayer, or even as far as being in contact with the edge face of the exterior substrate, but over only part of the height of this edge face of the exterior substrate since the lip is also in contact with this edge face.

For the mechanical reliability of the clip-fastening it is preferable for said tape to have a width between said groove and said edge face which is comprised between 0.2 and 5.0 mm, or even between 0.5 and 3.0 mm.

Said tape may be situated underneath and in contact with said lip so as to increase the mechanical cohesion.

Said tape may have, in cross section, the shape of a square, a rectangle or an L, so as to conform to the space available between said groove and said edge face of said interior substrate, or even also between said peripheral edge of said interior face and said interior flange.

In particular, said tape preferably has, in cross section, an L-shape when it extends between said peripheral edge of said interior face and said interior flange.

Said tape is preferably situated along the lower edge of a vehicle windshield.

Said tape, viewed in cross section, may be situated between said groove and an adhesive band which is situated on said interior flange.

The cover piece is a piece intended to be positioned further toward the outside than the profiled strip.

In one specific alternative form, viewed in cross section, said exterior face of said exterior substrate is free with respect to said groove, and said groove is preferably flush in the continuity of said exterior face.

In another specific alternative form, said interior flange of said profiled strip comprises at least one hole passing through said interior flange, said hole preferably having a length comprised between 2.0 and 50.0 mm and a width comprised between 2.0 and 10.0 mm.

This hole may allow a crenellation lower part of the polymer tape to be clip-fastened.

Entirely surprisingly, it has thus been discovered that it is possible to create at least one hole in the interior flange of the profiled strip in order to give it conformation flexibility and that when this hole is positioned in the lower part of the profiled strip, namely in a region of a bottom recess of the profiled strip when the strip is observed along its length, that makes it possible to alter the curvature of the profiled strip very slightly and therefore makes it easier to make it conform to the bottom edge of the glazed element, even when the latter does not have exactly the desired dimensions.

Furthermore, this hole then allows the removal of water which may otherwise stagnate at this point and become a source of contamination which may damage the cohesion of the glazed element which is a laminated glazed element (particularly in the case of washing fluid used to wash the glazing).

Said adhesive band allows the definitive attachment of the profiled strip to the glazed element after its position with respect to the glazed element has been adjusted if necessary thanks to the presence of the hole or holes.

For preference, the hole (or each hole) has a rectangular cross section with a length comprised between 10.0 and 20.0 mm and a width comprised between 2.0 and 6.0 mm; for preference, said polymer tape has a boss or crenellation of a shape that complements said hole. This crenellation therefore has a rectangular cross section with a length comprised between 10.0 and 20.0 mm and a width comprised between 2.0 and 6.0 mm.

When said glazing comprises a single bottom part, said profiled strip may have a single hole centered lengthwise on a point that is the lowermost point of said profiled strip.

When said glazing comprises two lower parts, said glazing comprises two holes, each one centered lengthwise on a lowermost point of said profiled strip.

Said hole is preferably situated vertically in line with said groove, namely vertically below the edge face of the glazed element. The bottom of the groove is continuous; it has no hole; said hole therefore does not open into said groove.

In an alternative form, said interior flange comprises a tenon which itself comprises a hole.

For preference, said hole in said profiled strip when viewed in cross section is situated between said groove and an adhesive band situated on said interior flange.

The present invention also relates to the profiled strip alone, for use thereof in the glazing according to the invention, this profiled strip comprising, viewed in cross section, a groove for the clip-fastening of a cover piece onto said profiled strip, a lip and an interior flange and further comprising a polymer tape extending longitudinally in a corner between said groove and said interior flange; this tape thus extends underneath said lip; it may be in contact with this lip.

Advantageously, the present invention makes it possible to offer a glazing with a profiled clip-fastening strip which is reliable, with part of the clip-fastening system being able to conform to dimensional spread on the glazed element: that being the polymer tape.

The present invention thus makes it possible to produce a clip-fastening system that is compact while at the same time reliable.

BRIEF DESCRIPTION OF THE DRAWINGS

Several embodiments of the present invention will be described hereinafter by way of nonlimiting example with reference to the attached drawings in which.

Within each figure, the elements in the background have generally not been depicted, so as to make the figures easier to interpret.

DETAILED DESCRIPTION

Figure 1:
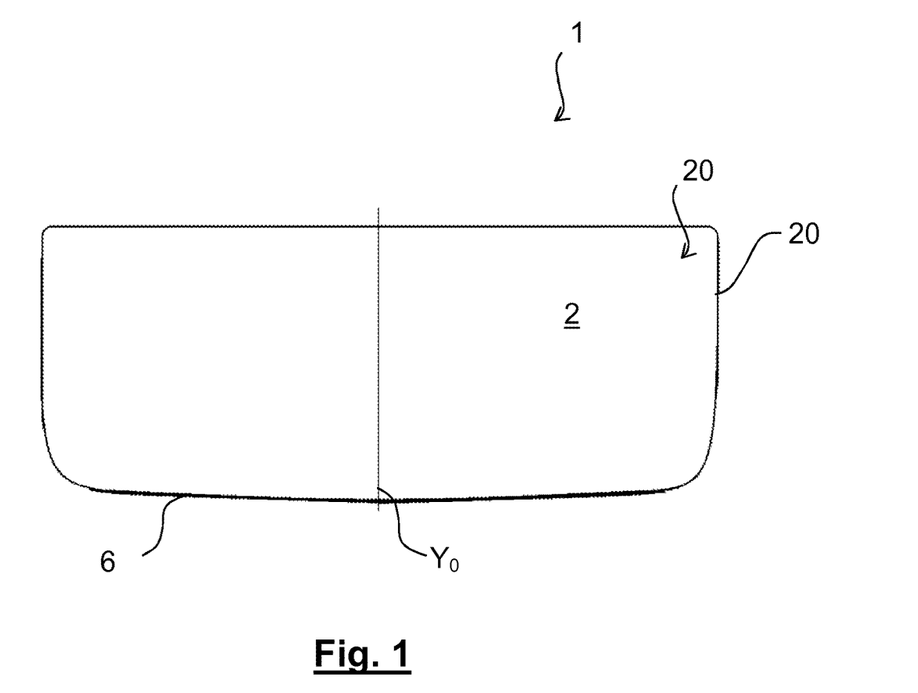
FIG. 1 is an (exterior) front view of a vehicle glazing according to the invention comprising, at the bottom, a profiled strip centered longitudinally along the vertical central axis $Y_0$.
Figure 2:
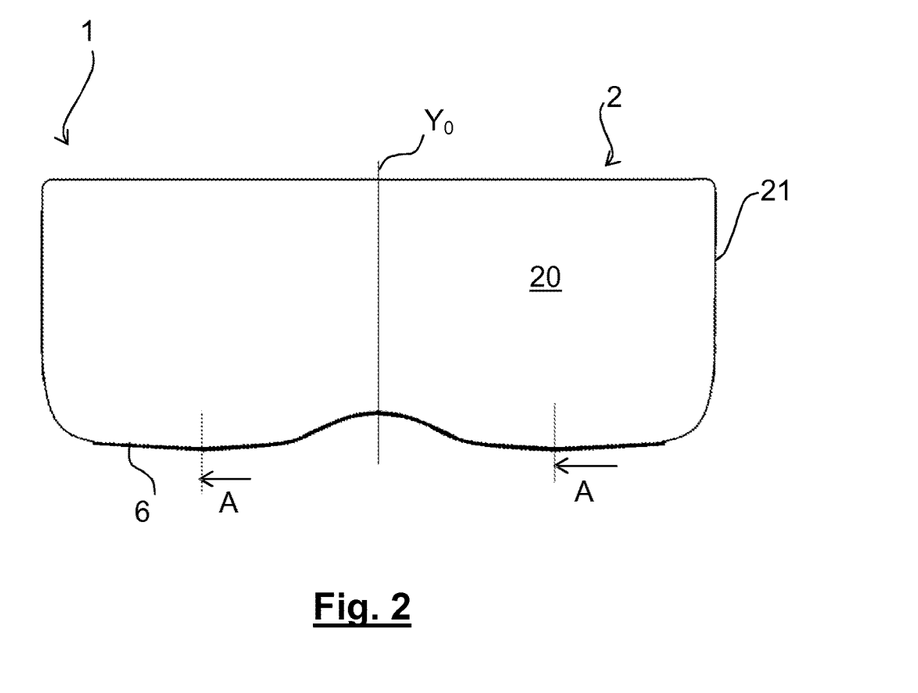
FIG. 2 is an (exterior) front view of another vehicle glazing according to the invention comprising at the bottom a profiled strip the interior flange of which has two bottom parts centered longitudinally, along a vertical axis A.

The present invention relates to a vehicle glazing 1, as visible in FIG. 1 or 2, comprising a glazed element 2. This glazing is a fixed glazing.

Because this glazing is a vehicle glazing, this glazing provides the separation between an exterior space E which is outside the vehicle and an interior space I which is inside the vehicle. The ideas of "exterior" and "interior" are therefore considered with respect respectively to this exterior space E and this interior space I.

In FIGS. 1 and 2, the glazing is viewed from the outside, oriented vertically as in a vehicle.

The glazing 1 is intended to close an opening formed in a bodywork of the vehicle.

In the context of the present document, the idea of "centripetal" and that of "centrifugal" is to be considered with respect to the central longitudinal axis of forward travel of the vehicle equipped with the glazing according to the invention used as a windshield, which means to say the axis generally referred to as the "X-X' axis" of the vehicle, which is perpendicular to the plane of the sheet in FIGS. 1 and 2; the centrifugal direction is perpendicular to this axis and in the direction of this axis whereas the centripetal direction is perpendicular to this axis and in the opposite direction, extending away from this axis.

In FIG. 1, the bottom edge of the glazed element comprises a single bottom part and one single lowermost point, centered in the lengthwise direction of the glazing (namely the widthwise direction of the vehicle) on a central vertical axis $Y_0$.

In FIG. 2, the bottom edge of the glazed element comprises two distinct bottom parts, separated by a central high part which lies on a central vertical axis $Y_0$ which is itself centered in the lengthwise direction of the glazing (which means to say the widthwise direction of the vehicle). The two bottom parts are positioned symmetrically on each side of this axis $Y_0$.

Each bottom part is centered lengthwise with respect to a vertical axis A.

The present invention is described in particular in application to a vehicle windshield and more specifically in the context of an application to a lower edge of a vehicle windshield.

Thus, the glazed element 2 is a laminated glazed element which comprises, as may be seen in the views in cross section of FIGS. 3 to 6, an exterior substrate 3, an interior substrate 5 and a plastic interlayer 4 situated between said two substrates and in contact with each of these two substrates, each substrate consisting of a sheet of glass.

The glazed element 2 of the glazing 1 is a laminated glazing comprising, from the exterior toward the interior, at least: the exterior substrate 3, the plastic interlayer 4 and the interior substrate 5; however, it is possible for at least one other sheet to be interposed between the exterior substrate 3 and the plastic interlayer 4 or between the plastic interlayer 4 and the interior substrate 5.

The exterior substrate 3 has an exterior face 30 which is oriented toward the exterior E, an interlayer face 32 which is oriented toward the plastic interlayer 4, and an edge face 31 situated between these two faces.

The interior substrate 5 has an interlayer face 50 which is oriented toward the plastic interlayer 4, an interior face 52 which is oriented toward the interior I and an edge face 51 situated between these two faces.

The plastic interlayer 4 has an exterior interlayer face 40 which is oriented toward the interlayer face 32 and which in this instance is in contact with this interlayer face 32, an interior interlayer face 42 which is oriented toward the interlayer face 50 and which in this instance is in contact with this interlayer face 50, and an edge face 41 situated between these two interlayer faces 40, 42.

The glazed element 2 thus has an exterior face 20 produced by the exterior face 30 of the exterior substrate 3, an interior face 22 produced by the interior face 52 of the interior substrate 5 and an edge face situated between these two faces, corresponding to the edge face 31 of the exterior substrate 3, to the edge face 41 of the plastic sheet 4 and to the edge face 51 of the interior substrate 5, these three edge faces here being in the continuity of one another.

The glazing 1 comprises, in addition to the glazed element 2, along at least part of at least one bottom edge a profiled strip 6 comprising a groove 60 for the clip-fastening of a cover piece 7 onto said profiled strip 6, said cover piece 7 comprising, viewed in cross section, a barbed hook 70 that enters said groove 60 at the time of clip-fastening.

The groove 60 has a mouth and a bottom: when the cover piece 7 is clip-fastened on, the barbed hook 70 enters the groove 60 via the mouth and in the direction toward the bottom; in general, in the clip-fastened position, the barbed hook 70 does not touch the bottom of the groove.

The mouth of the groove, via which the barbed hook 70 is introduced, is made by two throats: a centrifugal throat 67, situated to the left of the barbed hook 70 in FIGS. 3 to 6 and a centripetal throat 68, situated to the right of the barbed hook 70 in these same figures. These two throats are there to guide the barbed hook 70 with precision toward the bottom of the groove 60 during the clip-fastening of the barbed hook 70.

The cover piece 7 is intended to be positioned further toward the exterior than the profiled strip 6 and to cover it at least in part when the glazing 1 is viewed from the exterior E.

The groove 60 is lateral: the groove 60 of the profiled strip extends along the lower edge of the glazed element, facing the edge face of the glazed element 2 when the glazed element is considered as installed in the opening. In absolute terms, the groove 60 could be situated facing just part of the edge face 21 of the glazed element 2: for example facing the edge face 41 and the edge face 51 but not facing the edge face 31.

The mouth of the groove is oriented toward the exterior.

The bottom of the groove 60 may be situated further toward the interior than the interior face 22 of the glazed element; that does not impair the positioning of the glazing in the bodywork opening because there is space under the interior face 22.

Figure 3:
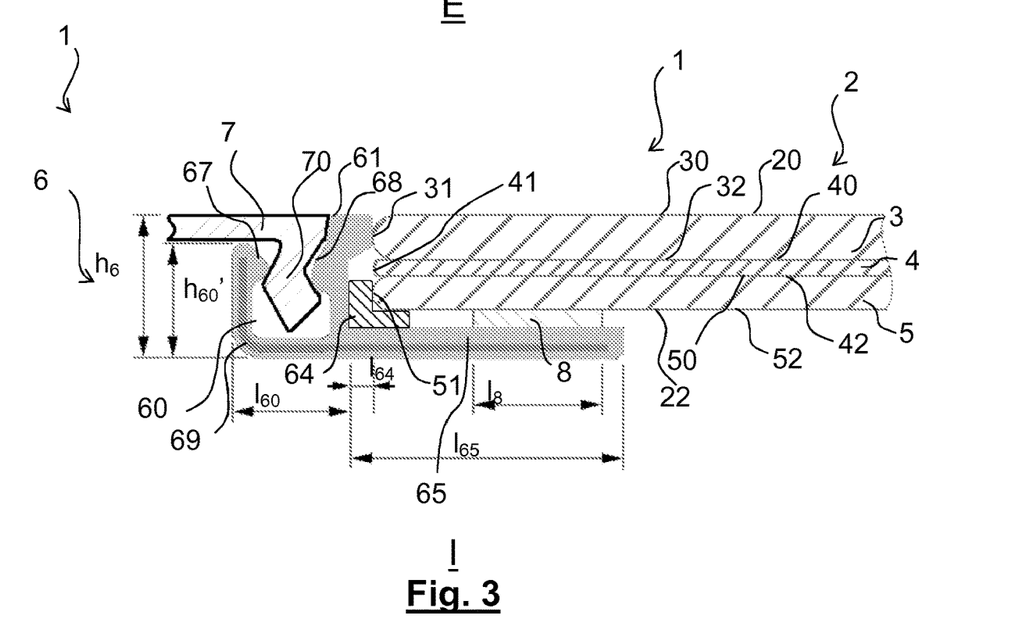
FIG. 3 is a partial view in cross section on the axis $Y_0$ or A of FIGS. 1 and 2 respectively, of a first embodiment of the profiled strip, the cover piece being positioned in the prolongation of the exterior face of the glazed element.
Figure 4:
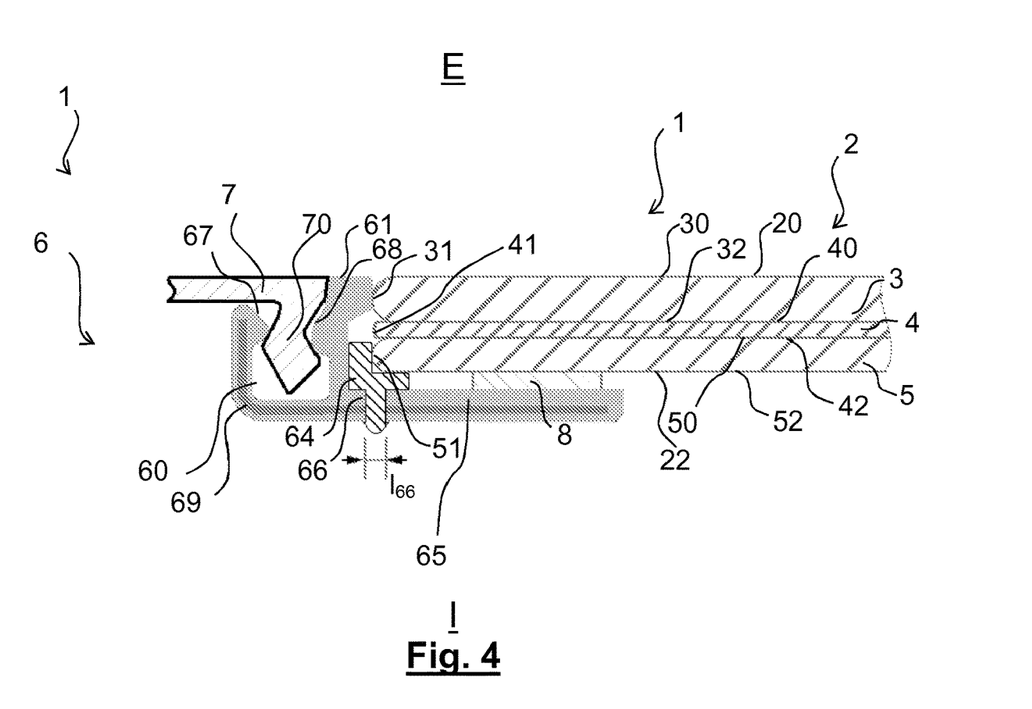
FIG. 4 is a partial view in cross section of an alternative form of the first embodiment of FIG. 3, the polymer tape passing through the interior flange via at least one hole made in this flange.
Figure 5:
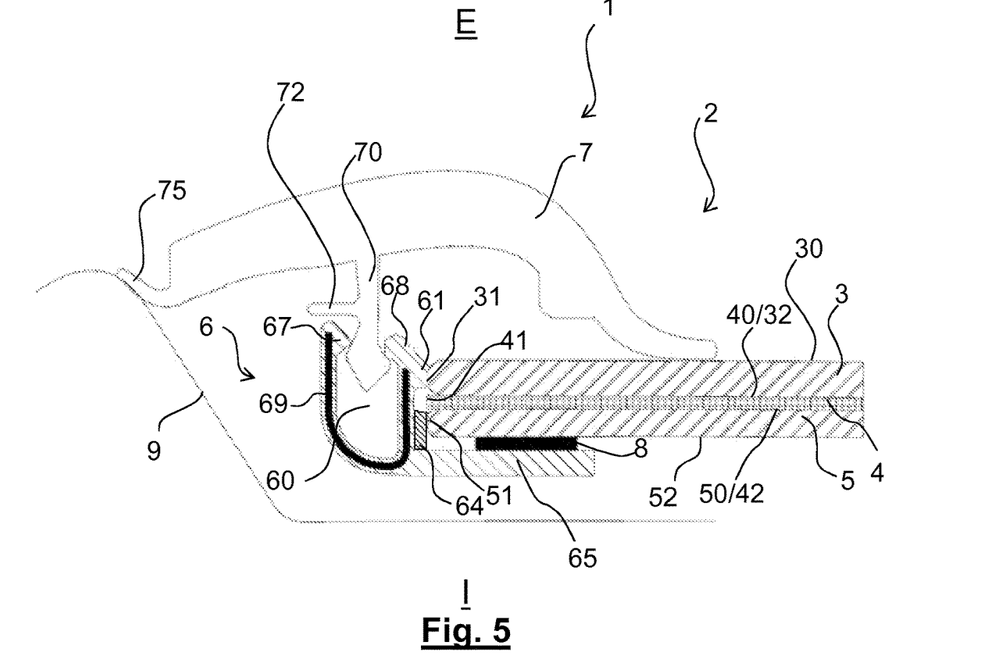
FIG. 5 is a partial view in cross section along the axis $Y_0$ or A of FIGS. 1 and 2 respectively, of a second embodiment of the profiled strip, the cover piece being positioned overhanging over the exterior face of the glazed element.
Figure 6:
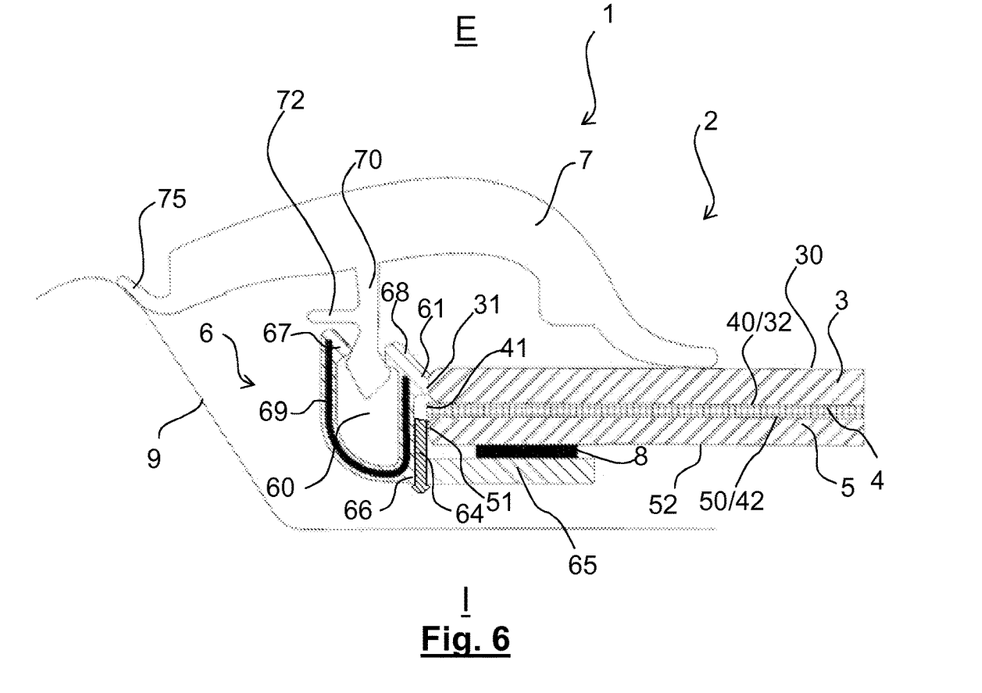
FIG. 6 is a partial view in cross section of an alternative form of the second embodiment of FIG. 5, the polymer tape passing through the interior flange via at least one hole made in this flange.

The two throats of the mouth of the groove are each hammerhead shaped with the heads almost facing one another, the centrifugal throat 67 being situated slightly further toward the interior than the centripetal throat 68 in the embodiment of FIGS. 3 and 4, whereas the centrifugal throat 67 is situated slightly further toward the exterior than the centripetal throat 68 in the embodiment of FIGS. 5 and 6.

The barbed hook is a double hook: it is made up, when viewed in cross section, of two bosses facing away from one another and offset, the centrifugal boss intended to sit under the centrifugal throat 67 being situated slightly further toward the exterior than the centripetal boss that is intended to sit under the centripetal throat 68.

Clip-fastening thus consists in the barbed hook 70 entering the groove 60 and, more specifically, in the two bosses of the barbed hook entering the groove 60 and under the two throats.

For correct retention, the width of the mouth, at the shortest distance between the two throats, is less than the width of the two bosses at their widest.

The material of which the groove 60 is made may be reinforced by the presence, on the inside, of a tenon 69, such as a metallic insert for example, which makes it possible to increase the rigidity of the groove. This tenon may for example be an aluminum profiled section with a thickness of 0.4 mm. It increases the rigidity of the groove 60.

The profiled strip 6 comprises, viewed in cross section, an interior flange 65 situated underneath said interior face 22 of the glazed element.

Said interior flange 65 is formed as one with the groove 60; it is situated near the bottom of the groove, outside of the groove and extends toward the inside and upward (when the windshield is considered as mounted in the bodywork opening).

In FIGS. 3 to 6, the profiled strip 6 is illustrated in section very exactly in a bottom part of this profiled strip.

Thus, in conjunction with FIG. 1, the view in cross section is centered lengthwise on a lowermost point of the glazed element, namely on the axis $Y_0$. This is also the lowermost point of the profiled strip.

According to the invention, the glazing 1 further comprises a polymer tape 64 situated between said groove 60 and said edge face 51 of said interior substrate 5, as visible in FIGS. 4 to 6, or even between said peripheral edge of said interior face 52 and said interior flange 65, as visible in FIGS. 4 and 5 only.

The tape 64 extends along the lower edge of the glazed element 2 in contact, all along the profiled strip, at least on the one hand with the groove 60 and on the other hand with the edge face 51.

When the profiled strip is fixed to the glazed element, the polymer tape may be compressed to a greater or lesser extent in order to conform to dimensional spread there might be between the reference position of the edge face of the interior substrate and the actual position thereof.

In FIGS. 3 and 4, the tape 64 has, when viewed in cross section, the shape of an L oriented vertically, with:
the base of the L situated under the peripheral edge of the interior face 52, between this interior face 52 and the interior flange 65, in contact both with this interior face 52 and with the interior flange 65;
the flange of the L situated between the edge face 51 and the groove 60, in contact both with this edge face 51 and with the groove 60.

When viewed in cross section, the tape 64 has a width 154 between said groove 60 and the edge face 51 which is comprised between 0.5 and 5.0 mm and which in this instance is precisely 2.0 mm. These are the dimensions that give the best flexibility to the profiled strip and the best sealing.

However, before the profiled strip 6 is bonded to the interior face 52, the tape 64 preferably has a greater width: the tape 64 is thus compressed between the groove 60 and the edge face 51. The widthwise compression ratio may be comprised between 5% and 75%. Here it is 50%, which means to say that in the uncompressed state, the tape has twice the width, namely 4.0 mm.

When viewed in cross section, the exterior face 20 of the glazed element 2 is preferably free with respect to said groove 60.

The profiled strip 6 is prefabricated: it is fabricated by extrusion through an extrusion die, and then is curved along its length to conform to the overall shape of the bottom part of the glazed element along its length.

The tape 64 is also prefabricated: it is preferably fabricated at the same time as the profiled strip by co-extrusion through a single extrusion die.

The glazed element 2 is fabricated before the profiled strip 6 is fixed to the glazed element 2, that is to say the glass substrates 3, 5 are laminated together with the plastic interlayer in order to form a laminated glazing before the profiled strip 6 is fixed to the glazed element 2.

In order to fix the profiled strip 6 to the glazed element 2, it is recommended:
that the lip 61 be positioned against the edge face 31 of the exterior substrate 3,
then that the tape 64 be positioned against the edge face 51 of the interior substrate 5 by pressing manually, or using a robot, the groove 60 against the edge face 51 at this point thereby crushing the tape 64,
then that the profiled strip be made to stick to the glazed element 2 by pressing the adhesive band against the interior face 52.

This adhesion may be performed using an adhesive band 8 formed by a layer of adhesive or an adhesive tape, in particular a double-sided adhesive tape, which is situated on the exterior face of the interior flange.

The interior flange 65 has a width $l_{65}$, illustrated in FIG. 3, comprised between 5.0 and 20.0 mm, or even comprised between 8.0 and 15.0 mm, in particular of 12 mm. This width is enough to ensure that the interior flange is held firmly against the interior substrate.

In the embodiment illustrated in FIGS. 3 and 4, the cover piece 7 is intended to be positioned further toward the exterior than the profiled strip 6 and to cover it only in part when the glazing 1 is viewed from the exterior E; the top of the centrifugal throat 68 constitutes the lip 61 the exterior face of which is both in the continuity of (flush with) the exterior face 20 of the glazed element and in the continuity of (flush with) the exterior face of the cover piece 7.

The centripetal throat 67 is situated less far toward the exterior than the centrifugal throat 68 so that when the cover piece 7 is clip-fastened into the groove 60 an exterior face of the cover piece 7 is in the continuity of the exterior surface 30 of the exterior substrate 3; the cover piece is flush with the exterior substrate 3 via the profiled strip 6 flush both with the exterior face of the glazed element and with the exterior face of the cover piece.

With reference to FIG. 3, the profiled strip has an overall height $h_6$ of around 7.8 mm and the groove 60 has a height $h_{60}$, of around 5.5 mm and a width $l_{60}$ of around 5.0 mm.

The tenon 69 is flat in the space situated under the interior face 22 and continues into the material of which the groove 60 is formed in the portion of this groove that is the opposite portion to the portion against the edge face, so as to stiffen the interior flange 65 still further.

In the embodiment illustrated in FIG. 5, the cover piece 7 is intended to be positioned further toward the exterior than the profiled strip 6 and to cover it completely when the glazing 1 is viewed from the exterior E. Here, in the context of the application to a lower edge of a windshield, this is a piece intended to enhance the appearance of the edge of the glazing and that is positioned against the rebate 9 thanks to the presence of a lip 75. It may be a piece of trim.

In this second embodiment moreover, the two throats are situated further toward the exterior than the exterior face of the glazed element; they are situated above this exterior face 20 when the prolongation of this face beyond the edge face 31 is considered.

In FIG. 5, the tape 64, when viewed in cross section, has the shape of a rectangle oriented vertically.

The interior flange 65 is a single flange, made from the same material and formed as one with the groove 60, without a reinforcement.

An edge of the opening that the glazing 1 is to close—in this instance a lower edge—is illustrated in FIG. 5 as a rebate 9.

FIG. 5 also illustrates an independent alternative form in which the barbed hook 70 comprises, when viewed in cross section, a frontal stop 72 situated outside of said groove 60.

This frontal stop 72 here is centrifugal and lies against the centrifugal throat 67 at the time of the clip-fastening, but could be centripetal and lie against the centripetal throat 68 at the time of clip-fastening; its purpose is to limit the extent to which the barbed hook 70 penetrates the groove 60.

For preference, as visible in FIG. 5, the bottom of the groove 60 does not form a symmetric U but an asymmetric U, with a larger radius of curvature on the side of the rebate 9, making it possible to reduce the size of the groove with respect to the adjacent rebate.

More particularly, the use of a groove with an asymmetric bottom having a larger radius of curvature on the side of the rebate means that the inclination of the rebate in its part adjacent to the edge face of the glazed element can be increased by an angle of the order of 20° and the distance d between the rebate 9 and the centrifugal bottom of the groove can therefore be reduced from a value of around 9 mm to a smaller value of around 4.5 mm. That represents a significant space saving and thus makes it possible to make the clip-fastening system more compact and to increase the size of the glazing.

In this second embodiment, a masking band (not illustrated) situated further toward the exterior than the interior flange and with a width of 20 mm measured from the edge face of the glazed element will be sufficient to mask both the interior flange and the bead of adhesive (not illustrated) used to fix the glazing to the body work.

FIGS. 4 and 6 respectively illustrate an alternative form of FIGS. 3 and 5 for which the polymer tape is not manufactured by co-extrusion at the same time as the profiled strip but is manufactured independently of the profiled strip and then clipped onto the profiled strip.

In this alternative form, the interior flange 65 comprises at least in a bottom part of the profiled strip at least one hole 66 passing though said interior flange 65. This hole passes right through the flange: it opens both onto an exterior surface of the interior flange and onto an interior surface of the interior flange.

In FIG. 4, the tenon 69 has passes through it the hole 66 that passes through the interior flange 65.

The hole 66 allows the introduction of a crenellation formed in an interior face of the polymer tape, so that this crenellation passes through the interior flange in order to hold the tape with respect to the interior flange 65.

In FIGS. 4 and 6, the glazing 1 is illustrated in cross section very exactly in a bottom part of this glazing, at the point where a hole 66 is situated.

Thus, in conjunction with FIG. 1, the hole 66 in the interior flange is a single hole and is centered lengthwise on a lowermost point of the glazed element, namely on the axis $Y_0$. This is also the lowermost point of the profiled strip.

In conjunction with FIG. 2, there are two holes 66 in the interior flange, each being centered lengthwise on a lowermost point of the glazed element, namely on the axis A.

It is possible to add further holes, particularly to encourage attachment of the polymer tape 64 to the profiled strip 6.

The hole 66 preferably has a length comprised between 2.0 and 50.0 mm and a width $l_{66}$ comprised between 2.0 and 10.0 mm; the crenellation of the polymer tape then itself has a length comprised between 2.0 and 50.0 mm and a width $l_{66}$ comprised between 2.0 and 10.0 mm.

By way of preferential example, the hole 66 may have a rectangular cross section with a length comprised between 10.0 and 20.0 mm, in particular of 15.0 mm, and a width $l_{66}$ comprised between 2.0 and 6.0 mm, in particular of 4.0 mm; the crenellation of the polymer tape then itself has a length comprised between 10.0 and 20.0 mm, in particular of 15.0 mm, and a width comprised between 2.0 and 6.0 mm, in particular of 4.0 mm.

The hole 66 is situated vertically in line with the groove 60, namely just at the junction between the interior flange 65 and the groove 60; the crenellation of the polymer tape is then itself situated vertically in line with the groove 60, namely just at the junction between the interior flange 65 and the groove 60.

When viewed in cross section, the hole 66 is situated between the groove 60 and the adhesive band 8 which is situated on said interior flange 65.

In FIG. 6, the crenellation has exactly the same width as the polymer tape.

Whether or not the polymer strip has at least one crenellation, when manufactured independently of the profiled strip 6, it may be bonded to the profiled strip using a layer of adhesive.

In FIGS. 3 to 6, the lip 61 of the profiled strip 6 which is in contact with the edge face 31 of the exterior substrate is formed as one with the groove 60; however, it is possible for the lip 61 to be made from a different material from that of the groove; in that case, it may also be manufactured by co-extrusion at the same time as the groove 60 and the tape 64 are being manufactured.

When the profiled strip 6 is considered alone, without the glazed element, the tape 64 extends longitudinally in a corner between the groove 60 and the interior flange 65.

Figure 7:
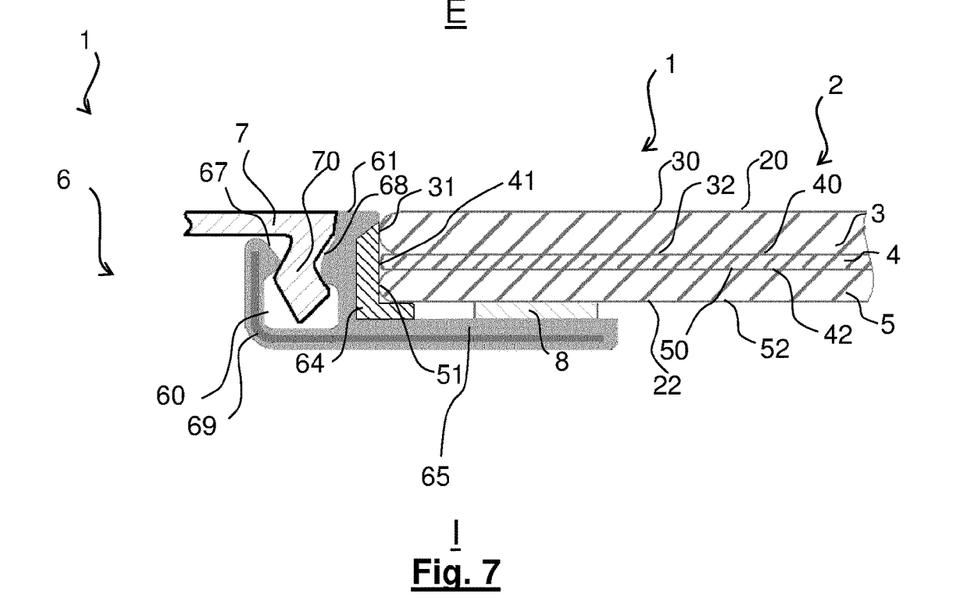
FIG. 7 is a partial view in cross section of another alternative form of the first embodiment of FIG. 3, the polymer tape extending heightwise as far as coming into contact with the edge face of the exterior substrate.
Figure 8:
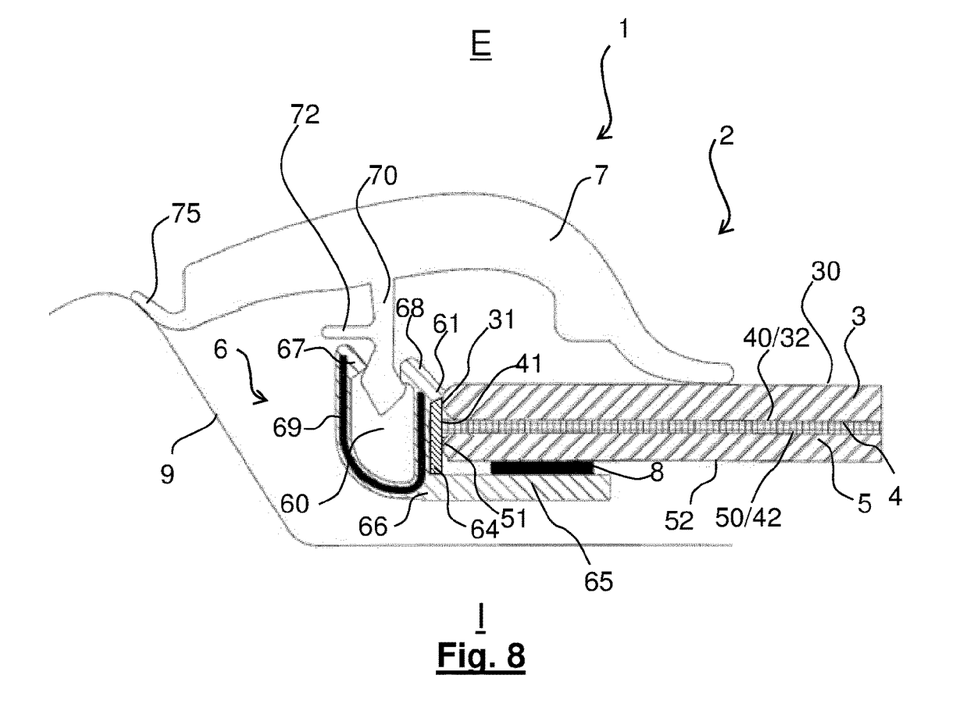
FIG. 8 is a partial view in cross section of another alternative form of the second embodiment of FIG. 5, the polymer tape extending heightwise as far as coming into contact with the edge face of the exterior substrate.

FIGS. 7 and 8 respectively illustrate another alternative form of FIGS. 3 and 5, for which the polymer tape 64 extends along the entirety of the edge face of the glazed element 2, namely the tape 64 is in contact with the edge face 41 of the plastic interlayer 4 and also with the edge face 51 of the interior substrate 5 and the edge face 31 of the exterior substrate 3; however, the tape 64 is in contact with just part of the height of this edge face 51 of the exterior substrate since the lip 61 is also in contact with this edge face.

The invention claimed is:

1. A glazing, comprising:
a laminated glazed element comprising
   an exterior substrate having an exterior face which faces an exterior space, an intermediate face opposite the exterior face, and a peripheral edge face,
   an interior substrate having an interior face which faces an interior space, an intermediate face opposite the interior face, and a peripheral edge face,
   a plastic interlayer situated between and in contact with the intermediate face of said exterior substrate and the intermediate face of said interior substrate, and
a profiled strip arranged along at least part of at least one edge of said laminated glazed element, the profiled strip comprising a groove for a clip-fastening of a cover piece to said profiled strip, said cover piece comprising, viewed in cross section, a barbed hook that enters said groove during clip-fastening,
said profiled strip comprising a lip situated against said peripheral edge face of said exterior substrate,
said profiled strip comprising, viewed in cross section, an interior flange situated underneath a peripheral edge of said interior face of said interior substrate, and
a polymer tape situated between said groove and said peripheral edge face of said interior substrate so as to fill a space extending from said profiled strip to said peripheral edge face of said interior substrate.

2. The glazing as claimed in claim 1, wherein said tape has a width between said groove and said peripheral edge face which is comprised between 0.2 and 5.0 mm.

3. The glazing as claimed in claim 1, wherein said tape is situated underneath and in contact with said lip.

4. The glazing as claimed in claim 1, wherein said tape is in contact with said peripheral edge face of said exterior substrate.

5. The glazing as claimed in claim 1, wherein said tape has, in cross section, the shape of a square, a rectangle or an L.

6. The glazing as claimed in claim 1, wherein said glazing forms a vehicle windshield and said tape is situated along a lower edge of the vehicle windshield.

7. The glazing as claimed in claim 1, wherein said tape, viewed in cross section, is situated between said groove and an adhesive band which is situated on said interior flange.

8. The glazing as claimed in claim 1, wherein said interior flange of said profiled strip comprises at least one hole passing through said interior flange.

9. The glazing as claimed in claim 1, wherein, viewed in cross section, said exterior face of said exterior substrate is free with respect to said groove.

10. A profiled strip for a glazing as claimed in claim 1, comprising a polymer tape which extends longitudinally in a corner between said groove and said interior flange.

11. The glazing as claimed in claim 1, wherein the glazing is a vehicle glazing.

12. The glazing as claimed in claim 1, wherein the polymer tape is also situated between said peripheral edge of said interior face and said interior flange.

13. The glazing as claimed in claim 2, wherein the width is between 0.5 and 3.0 mm.

14. The glazing as claimed in claim 8, wherein said hole has a length comprised between 2.0 and 50.0 mm and a width comprised between 2.0 and 10.0 mm.

15. The glazing as claimed in claim 9, wherein said groove is flush with said exterior face.

16. The glazing as claimed in claim 1, wherein the polymer tape is in contact with both the profiled strip and said peripheral edge face of said interior substrate.

17. The glazing as claimed in claim 1, wherein the lip of the profiled strip is in contact with said peripheral edge face of said exterior substrate.

18. A glazing, comprising:
a laminated glazed element comprising
   an exterior substrate having an exterior face which faces an exterior space, an intermediate face opposite the exterior face, and a peripheral edge face,
   an interior substrate having an interior face which faces an interior space, an intermediate face opposite the interior face, and a peripheral edge face,
   a plastic interlayer situated between and in contact with the intermediate face of said exterior substrate and the intermediate face of said interior substrate, and
a profiled strip arranged along at least part of at least one edge of said laminated glazed element, the profiled strip comprising a groove for a clip-fastening of a cover piece to said profiled strip, said cover piece comprising, viewed in cross section, a barbed hook that enters said groove during clip-fastening,
said profiled strip comprising a lip situated against said peripheral edge face of said exterior substrate,
said profiled strip comprising, viewed in cross section, an interior flange situated underneath a peripheral edge of said interior face of said interior substrate, and
a polymer tape situated between said groove and said peripheral edge face of said interior substrate and arranged in contact with said profiled strip and said peripheral edge face of said interior substrate.

19. The glazing as claimed in claim 18, wherein said tape is situated underneath and in contact with said lip.

20. The glazing as claimed in claim 18, wherein said tape is in contact with said peripheral edge face of said exterior substrate.

* * * * *